United States Patent
Ito et al.

(10) Patent No.: US 8,408,649 B2
(45) Date of Patent: Apr. 2, 2013

(54) WALK-IN SEAT

(75) Inventors: Koji Ito, Kanagawa (JP); Hidehiko Fujioka, Kanagawa (JP)

(73) Assignee: Shiroki Corporation, Kanagawa (JP)

( * ) Notice: Subject to any disclaimer, the term of this patent is extended or adjusted under 35 U.S.C. 154(b) by 313 days.

(21) Appl. No.: 12/673,093

(22) PCT Filed: Sep. 5, 2008

(86) PCT No.: PCT/JP2008/066048
§ 371 (c)(1),
(2), (4) Date: Feb. 11, 2010

(87) PCT Pub. No.: WO2009/034921
PCT Pub. Date: Mar. 19, 2009

(65) Prior Publication Data
US 2011/0298264 A1    Dec. 8, 2011

(30) Foreign Application Priority Data
Sep. 10, 2007  (JP) .................. 2007-233690

(51) Int. Cl.
*B60N 2/00* (2006.01)
*B60N 2/02* (2006.01)

(52) U.S. Cl. .................. 297/341; 297/340; 297/378.1

(58) Field of Classification Search .................. 297/340, 297/341, 378.1, 378.12
See application file for complete search history.

(56) References Cited

U.S. PATENT DOCUMENTS

| 4,666,208 | A | * | 5/1987 | Tatematsu et al. | ............ | 297/341 |
| 4,707,030 | A | * | 11/1987 | Harding | ............ | 297/341 |
| 5,052,751 | A | * | 10/1991 | Hayakawa et al. | ............ | 297/341 |
| 5,137,331 | A | * | 8/1992 | Colozza | ............ | 297/341 |

(Continued)

FOREIGN PATENT DOCUMENTS

JP    60-177267    11/1985
JP    62-84536    5/1987

(Continued)

OTHER PUBLICATIONS

International Search Report from the Japanese Patent Office in International Application No. PCT/JP2008/066048 mailed Nov. 18, 2008.

(Continued)

*Primary Examiner* — Peter Brown
*Assistant Examiner* — Philip Gabler
(74) *Attorney, Agent, or Firm* — Finnegan, Henderson, Farabow, Garrett & Dunner, L.L.P.

(57) ABSTRACT

A walk-in seat is provided, which has decreased number of components, and has a vacant space formed below a seat cushion so that the walk-in seat may be used even for a different-level seat track. The walk-in seat has a first control lever 171 for unlocking a first locking mechanism 100; a second control lever 181 for unlocking a second locking mechanism 100'; a memory mechanism 300 holding the first control lever 171 such that when a first upper rail 5 is located between a middle position and a foremost position with a seatback being tilted most forward, the first locking mechanism 100 is unlocked; first cable means FC operating such that when the seatback of a seat is tilted to a most forward position, the means FC drives the first control lever 171 to unlock the first locking mechanism 100; and second cable means SC transmitting operation of the first control lever 171 to the second control lever 181.

5 Claims, 9 Drawing Sheets

U.S. PATENT DOCUMENTS

| | | | |
|---|---|---|---|
| 5,531,503 A * | 7/1996 | Hughes | 297/341 |
| 5,626,392 A * | 5/1997 | Bauer et al. | 297/341 |
| 6,102,478 A * | 8/2000 | Christopher | 297/341 |
| 6,257,541 B1 | 7/2001 | Timon et al. | |
| 7,222,918 B2 * | 5/2007 | Bronner et al. | 297/341 |
| 2007/0236067 A1 * | 10/2007 | Nathan et al. | 297/378.12 |

FOREIGN PATENT DOCUMENTS

| | | |
|---|---|---|
| JP | 01-150392 | 12/1989 |
| JP | 09-272366 | 10/1997 |
| JP | 9-315190 | 12/1997 |
| JP | 09-315190 | 12/1997 |
| JP | 11-321404 | 11/1999 |
| JP | 2000-004971 | 11/2000 |

OTHER PUBLICATIONS

Official Communication from Australia Patent Office for corresponding Australian Patent Application No. 20008298387 dated Oct. 25, 2011 along with List of Documents cited in Australian Office Action and Brief Explanation of cited references D1 and D3 (3 total pages).

Official Communication from Japanese Patent Office for corresponding Japanese Patent Application No. 2007-233690 dated Sep. 4, 2012 along with List of Documents cited in JP Office Action and Brief Explanation of cited references D1-D4 (6 total pages).

* cited by examiner

WALK-IN SEAT

TECHNICAL FIELD

The present invention relates to a walk-in seat, in which in the cast that a sitter gets in or out of a rear seat, when a seatback is tilted most forward with a sitter being not present on a front seat so that the sitter easily gets in or out of the rear seat, a locking mechanism of each seat track is unlocked so that the front seat is moved to a foremost position.

BACKGROUND ART

In a seat of a car or the like, a seat having a longitudinally movable seat sliding device has first and second seat tracks, each seat track having a lower rail provided on a floor side, and an upper rail being movably engaged with the lower rail, and being provided with a seat thereon, and a locking mechanism provided on each seat track to lock/unlock movement of the upper rail.

A seat sliding device of a front seat of a two-door vehicle sometimes has a walk-in mechanism, which tilts a seatback of the front seat forward, and unlocks the locking mechanism to automatically move the front seat to the foremost position by biasing force of biasing means so that a sitter easily gets in or out of a rear seat.

Two rods including first and second rods, which are connected to the seatback and to the locking mechanism of each seat track, are used to transmit such forward tilting operation of the seatback of the front seat to the locking mechanism of each seat track.

The walk-in mechanism has such a function called memory function that when a seat is returned back from the foremost position, the locking mechanism is relocked at an approximately middle position of a movement range of a seat track. A memory mechanism is provided on one seat track, and operation of the memory mechanism is transmitted to the other seat track by using a third rod connected to the memory mechanism and to the other seat track (for example, refer to patent document 1).

Patent document 1: JP-A-11-321404

DISCLOSURE OF THE INVENTION

Problems that the Invention is to Solve

However, the walk-in seat using the first to third rods has the following problems.

(1) The first and second rods are necessary to transmit the forward tilting operation of the seatback of the front seat to the locking mechanism of each seat track, and the third rod is necessary to transmit operation of the memory mechanism provided on one seat track to the other seat track, leading to increase in number of components.

(2) While the third rod must be disposed below a seat cushion, a space for disposing the rod is limited because of lowering of a cushion pad caused by seating. Moreover, since the third rod is disposed, an undertray, ECU (Electronic Control Unit), a CD changer or the like is hard to be disposed below the cushion.

(3) The third rod may not be bent, and therefore may not meet a different-level seat track (a seat track different in height between the first lower rail of the first seat track and the second lower rail of the second seat track).

The invention was made in the light of the above problem, and an object of the invention is to provide a walk-in seat having decreased number of components. Another object of the invention is to provide a walk-in seat having a vacant space formed below a seat cushion so that the walk-in seat may be used even for the different-level seat track.

Means for Solving the Problems

The invention according to claim 1 is a walk-in seat characterized by having a seat having a seat cushion supporting a hip of a sitter, and a seatback provided in a tiltable manner with respect to the seat cushion to support the back of the sitter; a first seat track including a first lower rail provided on a floor side, and a first upper rail being movably engaged with the first lower rail and being provided with the seat cushion of the seat thereon; a second seat track provided parallel to the first seat track, the second seat track including a second lower rail provided on the floor side, and a second upper rail being movably engaged with the second lower rail and being provided with the seat cushion of the seat thereon; a first locking mechanism provided on the first seat track to prohibit movement of the first upper rail with respect to the first lower rail; a first control lever rotatably provided on the first upper rail to unlock the first locking mechanism; a second locking mechanism provided on the second seat track to prohibit movement of the second upper rail with respect to the second lower rail; a second control lever rotatably provided on the second upper rail to unlock the second locking mechanism; a memory mechanism provided on the first seat track, the memory mechanism holding the first control lever such that when the first upper rail is located between a middle position and a foremost position with the seatback being tilted most forward, the first locking mechanism is unlocked; first cable means latched on the seatback at one end, and latched on the first control lever at the other end, the first cable means operating such that when the seatback of the seat is tilted to a most forward position, the first cable means drives the first control lever to unlock the first locking mechanism; and second cable means latched on the first control lever at one end, and latched on the second control lever at the other end, the second cable means transmitting operation of the first control lever to the second control lever.

First, the first and second locking mechanisms are unlocked to obtain desired seat track positions. Thus, since the first upper rail of the first seat track may be moved with respect to the first lower rail, and the second upper rail of the second seat track may be moved with respect to the second lower rail, each upper rail may be moved to each of the desired seat track positions. When the desired seat track positions are obtained, the first and second locking mechanisms are locked so that movement of the first upper rail of the first seat track with respect to the first lower rail, and movement of the second upper rail of the second seat track with respect to the second lower rail are prohibited respectively.

Next, the seatback is tilted most forward, and thus the first control lever is driven by the first cable means, so that the first locking mechanism is unlocked. Furthermore, operation of the first control lever is transmitted to the second control lever by the second cable means, so that the second locking mechanism is unlocked. Then, the seat is moved forward so that a sitter easily gets in or out of a rear seat. When the first upper rail is located between a middle position and a foremost position with the seatback being tilted most forward, the memory mechanism is operated to hold the first control lever such that the first locking mechanism is unlocked. Such operation of the first control lever is transmitted to the second control lever via the second cable means, so that the second locking mechanism is also unlocked.

When the seat is moved backward past the middle position, operation of the memory mechanism is finished, so that the first control lever is released from holding, and thus the first locking mechanism is locked so as to prohibit backward movement of the seat. Such operation of the first control lever is transmitted to the second control lever via the second cable means, so that holding of the second control lever is also released, and thus the second locking mechanism is also locked.

The invention according to claim 2 is the walk-in seat according to claim 1, characterized in that a continuous single cable is provided, the cable being latched on the seatback at the one end, latched on the first control lever at a middle portion, and latched on the second control lever at the other end, and a portion of the cable from the seatback to the first control lever is formed as the first cable means, and a portion of the cable from the first control lever to the second control lever is formed as the second cable means.

ADVANTAGE OF THE INVENTION

According to the inventions according to claims 1 and 2, the first and second cable means are used to transmit forward tilting operation of the seatback of the front seat to the locking mechanism of each seat track, and the second cable means is used to transmit operation of the memory mechanism provided on one seat track to the other seat track, leading to decrease in number of components compared with the previous example requiring three rods.

The second cable means being freely routable is used to transmit operation of the memory mechanism provided on one seat track to the other seat track, thereby a vacant space may be formed below a seat cushion. Moreover, since the cable means are flexible, the walk-in seat may be used even for a different-level seat track.

According to the invention according to claim 2, the continuous single cable is provided, the cable being latched on the seatback at one end, latched on the first control lever at a middle portion, and latched on the second control lever at the other end, and a portion of the cable from the seatback to the first control lever is formed as the first cable means, and a portion of the cable from the first control lever to the second control lever is formed as the second cable means, thereby the first and second cable means may be achieved only by one cable.

BEST MODE FOR CARRYING OUT THE INVENTION

General Configuration

A general configuration is described using FIG. 1 being a perspective view showing an inventive portion of this embodiment, FIG. 2 being a top view of a walk-in seat from which a seat is removed, and FIG. 3 being a configurative view of the walk-in seat of the embodiment as viewed from a side.

First, as shown in FIG. 3, a seat 11 has a seat cushion 13 supporting a hip of a sitter, and a seatback 17 provided in a tiltable manner with respect to the seat cushion 13 via a reclining mechanism 15 to support the back of the sitter.

Next, as shown in FIG. 2, 1 and 1' are first and second lower rails provided in parallel on a floor F. The first and second lower rails 1 and 1' are movably engaged with first and second upper rails 5 and 5' being provided with the seat cushion 13 of the seat 11 thereon, respectively.

The first lower rail 1 and the first upper rail 5 configure a first seat track 21. The second lower rail 1' and the second upper rail 5' configure a second seat track 23.

The first upper rail 5 has a first locking mechanism 100 thereon for prohibiting movement of the first upper rail 5.

The second upper rail 5' has a second locking mechanism 100' thereon for prohibiting movement of the second upper rail 5'.

Furthermore, the first upper rail 5 has a memory mechanism 300 thereon.

First Seat Track 21 and Second Seat Track 23

Since the first seat track 21 and the second seat track 23 have the same configuration, description is made only on the first seat track 21, and description of the second seat track 23 is omitted.

Description is made using FIG. 1 and FIG. 4 being a section view along a cutting-plane line A-A of FIG. 1. A sectional configuration of the first lower rail 1 includes a horizontally disposed base portion 1$a$; a first sidewall portion 1$b$ that is bent from one end of the base portion 1$a$, and extends upward; a second sidewall portion 1$c$ that is bent from the other end of the base portion 1$a$, and extends upward; a first top portion 1$d$ that is bent from an upper end of the first sidewall portion 1$b$, and extends toward the second sidewall portion 1$c$ approximately parallel to the base portion 1$a$; a second top portion 1$e$ that is bent from an upper end of the second sidewall portion 1$c$, and extends toward the first sidewall portion 1$b$ approximately parallel to the base portion 1$a$; a first trailing portion 1$f$ that is bent from the other end of the first top portion 1$d$ toward the base portion 1$a$, and is shorter than the first sidewall portion 1$b$; and a second trailing portion 1$g$ that is bent from the other end of the second top portion 1$e$ toward the base portion 1$a$, and faces the first trailing portion 1$f$ with a space in between, and has approximately the same length as that of the first trailing portion 1$f$.

The first upper rail 5 includes a top portion 5$a$ provided approximately parallel to the base portion 1$a$ of the first lower rail 1; a first sidewall portion 5$b$ that is bent from one end of the top portion 5$a$, and extends into the first lower rail 1 via a space between the first trailing portion 1$f$ and the second trailing portion 1$g$ of the first lower rail 1; a second sidewall portion 5$c$ that is bent from the other end of the top portion 5$a$, and extends into the first lower rail 1 via a space between the first trailing portion 1$f$ and the second trailing portion 1$g$ of the first lower rail 1; a first spring-up portion 5$d$ that extends from a lower end of the first sidewall portion 5$b$ into a space formed by the first sidewall portion 1$b$, the first top portion 1$d$, and the first trailing portion 1$f$ of the first lower rail 1; and a second spring-up portion 5$e$ that extends from a lower end of the second sidewall portion 5$c$ into a space formed by the second sidewall portion 1$c$, the second top portion 1$e$, and the second trailing portion 1$g$ of the first lower rail 1.

The first trailing portion 1$f$ and the second trailing portion 1$g$ of the first lower rail 1 have a plurality of holes 1$h$ and 1$i$ along a longitudinal direction respectively. The second sidewall portion 5$c$ and the second spring-up portion 5$e$ in a range of a cutout hole 5$g$ of the first upper rail 5 have holes 5$h$ and 5$i$ that may face the holes 1$i$ of the first lower rail 1 respectively.

First Locking Mechanism 100 and Second Locking Mechanism 100'

Since the first locking mechanism 100 and the second locking mechanism 100' are approximately the same, description is largely made on the first locking mechanism 100. In description of the second locking mechanism 100', the same portions as those of the first locking mechanism 100 are marked with the same symbols with a dash, and only different portions are described.

Description is made using FIGS. 1, 2 and 4.

As shown in FIG. 2, a loop handle 151 is disposed between the first and second seat tracks 21 and 23. The loop handle 151 has an approximately U shape including a first side portion 151a along the first seat track 21, a forehead 151b along a forehead of the seat cushion 13, and a second side portion 151c along the second seat track 23. On the other hand, a loop handle support bracket 161 is provided on the top portion 5a of the first upper rail 5 of the first seat track 21. Similarly, a loop handle support bracket 163 is provided on the top portion 5a' of the second upper rail 5' of the second seat track 23.

The first side portion 151a of the loop handle 151 is provided on the loop handle support bracket 161, and rotatable about an axis C (axis approximately perpendicular to a movement direction of the first upper rail 5 on a plane parallel to the base portion 1a of the first lower rail 1). Similarly, the second side portion 151c is provided on the loop handle support bracket 163, and rotatable about an axis C' (axis approximately perpendicular to a movement direction of the second upper rail 5' on a plane parallel to a base portion 1a' of the second lower rail 1').

A shaft 101 along a longitudinal direction of the first upper rail 5 is rotatably provided in the cutout hole 5g formed from the top portion 5a to the second sidewall portion 5c of the first upper rail 5. Furthermore, a locking lever 103 attached to the shaft 101 is disposed in the cutout hole 5g.

The locking lever 103 has three rotational ends.

(1) First Rotational End

The first rotational end corresponds to locking teeth 105 that are located within the first upper rail 5, and engaged with the holes 1i of the first lower rail 1 via the holes 5h of the first upper rail 5, and furthermore, engaged with the holes 5i of the first upper rail 5. The locking lever 103 is biased in a direction (locking direction), in which the locking teeth 105 are engaged with the holes 1i of the first lower rail 1, by not-shown biasing means (spring) engaged with the first upper rail 5 at one end, and engaged with the locking lever 103 at the other end.

(2) Second Rotational End

The second rotational end corresponds to a loop handle attachment 107. The loop handle attachment 107 extends out of the first upper rail 5 from the cutout hole 5g toward the second seat track 23.

The loop handle attachment 107 of the locking lever 103 of the first locking mechanism 100 is attached to a back portion of the mechanism 100 with respect to the axis C of the first side portion 151a of the loop handle 151, and a loop handle attachment 107' of a locking lever 103' of the second locking mechanism 100' is attached to a back portion of the mechanism 100' with respect to the axis C' of the second side portion 151c of the loop handle 151. Accordingly, when the forehead of the loop handle 151 is drawn up, the locking lever 103 of the first locking mechanism 100 and the locking lever 103' of the second locking mechanism 100' operate such that each of the locking teeth 105 and 105' moves in a direction away from each of the holes 1i of the first lower rail 1 and the holes 1i' of the second lower rail 1' (unlocking direction) against biasing force of the not-shown biasing means.

(3) Third Rotational End

The third rotational end corresponds to a control lever abutment portion 109 to be abutted with a control lever described later.

Next, the control lever is described using FIGS. 1, 2 and 5. FIG. 5 is an enlarged perspective view of a first control lever and a memory plate. In the figures, a first control lever 171 is rotatably attached by a pin 173 to the top portion 5a near the cutout hole 5g of the first upper rail 5. The first control lever 171 has a locking lever abutment portion 175 that may abut on the control lever abutment portion 109 of the locking lever 103, and pushes the portion 109 in an abutment direction after abutting thereon so as to rotate the locking lever 103 in an unlocking direction. The first control lever 171 is biased in a direction in which the locking lever abutment portion 175 is separated from the control lever abutment portion 109 of the locking lever 103 (an arrow D direction in FIG. 1) by not-shown biasing means (spring) engaged with the first upper rail 5 at one end, and engaged with the first control lever 171 at the other end.

A second control lever 181 is rotatably attached by a pin 183 to a top portion 5a' near a cutout hole 5g' of the second upper rail 5'. The second control lever 181 has a locking lever abutment portion 185 that may abut on a control lever abutment portion 109' of the locking lever 103', and pushes the portion 109' in an abutment direction after abutting thereon so as to rotate the locking lever 103' in an unlocking direction. The second control lever 181 is biased in a direction in which the locking lever abutment portion 185 is separated from the control lever abutment portion 109' of the locking lever 103' (an arrow D direction in FIG. 1) by not-shown biasing means (spring) engaged with the second upper rail 5' at one end, and engaged with the second control lever 181 at the other end.

A cable 201 is provided from the seatback 17 of the seat 11 to the second control lever 181 of the second lock mechanism 100' side via the first control lever 171 on a first lock mechanism 100 side. To describe in detail, the cable 201 extends forward from the seatback 17 along the first seat track 21. One end of the cable 201 is latched on a point other than a rotational center of the seatback 17, so that when the seatback 17 is tilted forward, the cable 201 is drawn. A middle portion of the cable 201 is latched on a cable latching portion 177 of the first control lever 171 on the first locking mechanism 100 side. The cable 201 extends backward along the second seat track 23 through the forehead of the seat 11. The other end of the cable 201 is latched on a cable latching portion 187 of the second control lever 181.

Specifically, the cable 201 is divided into first cable means FC extending from the seatback 17 to the first control lever 171, and second cable means SC extending from the first control lever 171 to the second control lever 181. Furthermore, in the embodiment, an outer casing 203 inserted with the cable 201 is provided in a cable portion, which corresponds to the second cable means SC, between the first control lever 171 and the second control lever 181.

When the seatback 17 of the seat 11 is tilted forward, the cable 201 is drawn, and the first control lever 171 and the second control lever 181 rotate against biasing force of the not-shown biasing means. Thus, the locking lever abutment portion 175 of the first control lever 171 abuts on the control lever abutment portion 109 of the locking lever 103, and pushes the portion 109 in the abutment direction, so that the locking lever 103 is rotated in the unlocking direction. Similarly, the locking lever abutment portion 185 of the second control lever 181 abuts on the control lever abutment portion 109' of the locking lever 103', and pushes the portion 109' in the abutment direction, so that the locking lever 103' is rotated in the unlocking direction.

Memory Mechanism 300

As shown in FIG. 1, a cancel lever 301 is rotatably provided via a not-shown bracket on the top portion 5a of the first upper rail 5 adjacently to the first control lever 171. A rotational plane of the cancel lever 301 is along a movement direction of the first upper rail 5, and perpendicular to a rotational plane of the first control lever 171.

The cancel lever 301 has a first control lever abutment portion 303 that may abut on the first cancel lever abutment portion 179 of the first control lever 171 in an unlocked state. When the first control lever abutment portion 303 of the cancel lever 301 abuts on the first cancel lever abutment portion 179 of the first control lever 171 in an unlocked state, the cancel lever 301 is prohibited from rotating in a locking direction.

The cancel lever 301 further has a second control lever abutment portion 305 that may abut on the second cancel lever abutment portion 178 of the first control lever 171 in a locked state. When the second control lever abutment portion 305 of the cancel lever 301 abuts on the second cancel lever abutment portion 178 of the first control lever 171 in a locking state, the first control lever abutment portion 303 of the cancel lever 301 is prohibited from rotating in a direction of abutting on the first cancel lever abutment portion 179 of the first control lever 171.

The cancel lever 301 is biased in a direction, in which the first control lever abutment portion 303 abuts on the first cancel lever abutment portion 179 of the first control lever 171, or the second control lever abutment portion 305 abuts on the second cancel lever abutment portion 178 of the first control lever 171, namely, biased in an arrow E direction in FIG. 5 by not-shown biasing means (spring) engaged with the first upper rail 5 at one end, and engaged with the cancel lever 301 at the other end.

As shown in FIGS. 1 and 4, a memory plate 304 is disposed on the base portion 1a of the first lower rail 1 of the first seat track 21. The cancel lever 301 has a memory plate abutment portion 307 extending into the first upper rail 5 through a cutout hole 5j formed in the top portion 5a of the first upper rail 5 so as to be able to abut on a top of the memory plate 304.

The memory plate 304 is provided from an approximately middle portion to a back portion in a longitudinal direction of the first lower rail 1.

Next, operation of the memory mechanism 300 is described using FIGS. 6 to 17. In FIGS. 6 to 17, FIGS. 6, 9, 12 and 15 are top views for illustrating operation of each of the first control lever 171 and the cancel lever 301, FIGS. 7, 10, 13 and 16 are front views of FIGS. 6, 9, 12 and 15 respectively, and FIGS. 8, 11, 14 and 17 are section views for illustrating operation of a locking mechanism in respective states of FIGS. 6, 9, 12 and 15.

(1) Normal Condition

Description is made using FIGS. 6 to 8.

When the seatback 17 is available for sitting, the first control lever 171 connected to the cable 201 is positioned as shown in FIG. 6. The second control lever abutment portion 305 of the cancel lever 301 abuts on the second cancel lever abutment portion 178 of the first control lever 171. In such a state of the cancel lever 301, the locking lever abutment portion 175 is positioned separately from the control lever abutment portion 109 of the locking lever 103, the memory plate abutment portion 307 is positioned separately from the top of the memory plate 304, and the first control lever abutment portion 303 is positioned separately from the first cancel lever abutment portion 179 of the first control lever 171.

Therefore, seat sliding is performed by operating the loop handle 151.

(2) Most Forward Tilting of Seatback

Description is made using FIGS. 9 to 11. In the initial state as shown in FIGS. 6 to 8, the seatback 17 is tilted most forward while a sitter is not present. Thus, the cable 201 is greatly drawn, and thus the first control lever 171 rotates to a solid-line position shown in FIG. 5. The first control lever 171 rotates in such a way, thereby the lock lever abutment portion 175 abuts on the control lever abutment portion 109 of the locking lever 103, and successively pushes the locking lever 103. Accordingly, the first locking mechanism 100 is unlocked. Such drawing of the cable 201 causes even rotation of the second control lever 181, unlocking the second locking mechanism 100'.

Furthermore, the second cancel lever abutment portion 178 is separated from the second control lever abutment portion 305 of the cancel lever 301. Thus, the cancel lever 301 rotates in the arrow E direction in FIG. 5 until the memory plate abutment portion 307 abuts on the top of the memory plate 304. In this state, the first control lever abutment portion 303 is still separated from the first cancel lever abutment portion 179 of the first control lever 171 while the portion 303 is close to the portion 179.

(3) Forward Sliding of Seat (Walk-in State)

Description is made using FIGS. 12 to 14. The seat 11 is moved forward in the state shown in FIGS. 9 to 11. In the embodiment, the seat 11 is biased forward by not-shown biasing means latched on a floor side at one end, and latched on a seat 11 side at the other end. The seat 11 may be manually advanced.

The memory plate abutment portion 307 of the cancel lever 301 is separated from the memory plate 304. Thus, the cancel lever 301 further rotates, so that the first control lever abutment portion 303 abuts on the first cancel lever abutment portion 179 of the first control lever 171. Therefore, the locking lever abutment portion 175 of the first control lever 171 is prohibited from being separated from the control lever abutment portion 109 of the locking lever 103. That is, the first locking mechanism 100 and the second locking mechanism 100' connected to the mechanism 100 by the cable 201 are kept to be unlocked.

Even if the seatback 17 is raised in this state, the cable 201 is singly loosened, and a state of the first control lever 171 is kept. Moreover, a state of the second control lever 181 is kept.

(4) Backward Sliding of Seat

Description is made using FIGS. 15 to 17. The seat 11 is moved back in the state shown in FIGS. 12 to 14. Thus, when the seat is moved back to a middle position, the memory plate abutment portion 307 of the cancel lever 301 gets on the top of the memory plate 304, and thus rotates to a solid line position in the figure. That is, the cancel lever 301 is returned into the state shown in FIG. 7, and therefore becomes rotatable. In such a state, when the seatback 17 is raised to be available for sitting, the first control lever 171 rotates to a solid line position, and the first locking mechanism 100 is thus locked. In addition, the second control lever 181 rotates, and the second locking mechanism 100' is thus locked.

According to such a configuration, the following advantages may be obtained.

(1) The first cable means FC of the cable 201 is used to transmit forward tilting operation of the seatback 17 of the front seat to the locking mechanism of each seat track, and the second cable means SC of the cable 201 is used to transmit operation of the memory mechanism 300 provided on one seat track to the other seat track, thereby the number of components is decreased compared with the previous example requiring three rods.

(2) The second cable means SC being freely routable is used to transmit operation of the memory mechanism 300 provided on the first seat track 21 to the other seat track, thereby a vacant space may be formed below the seat cushion 13. Moreover, since the cable means FC and SC are flexible, the walk-in seat may be used even for a different-level seat track.

(3) The continuous single cable 201 is provided, the cable being latched on the seatback 17 at one end, latched on the first control lever 171 at a middle portion, and latched on the second control lever 181 at the other end, and a portion of the cable from the seatback 17 to the first control lever 171 is formed as the first cable means FC, and a portion of the cable from the first control lever 171 to the second control lever 181 is formed as the second cable means SC, thereby the first and second cable means FC and SC may be achieved only by one cable 201.

Figure 1:
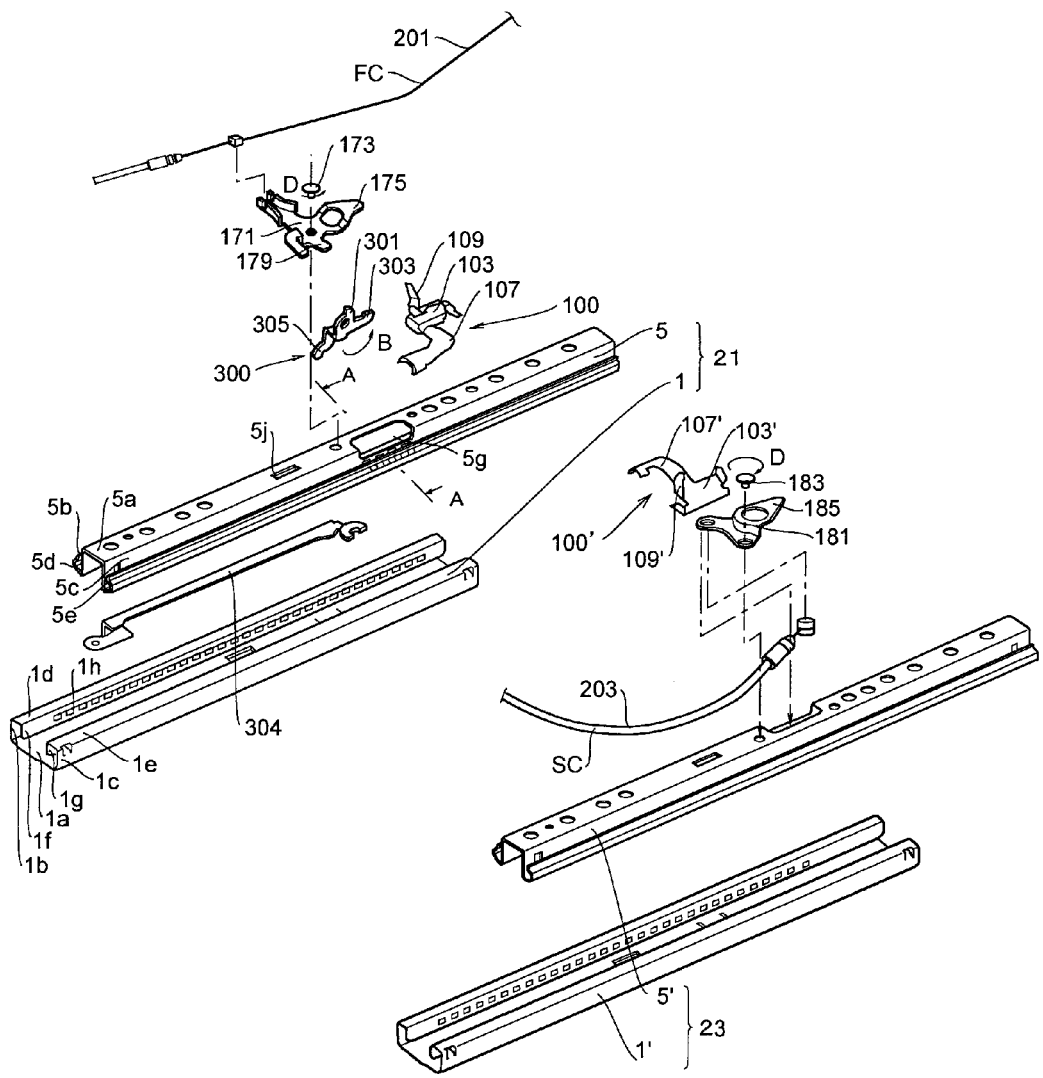
[FIG. 1] It is a perspective view showing an inventive portion of an embodiment.
Figure 2:
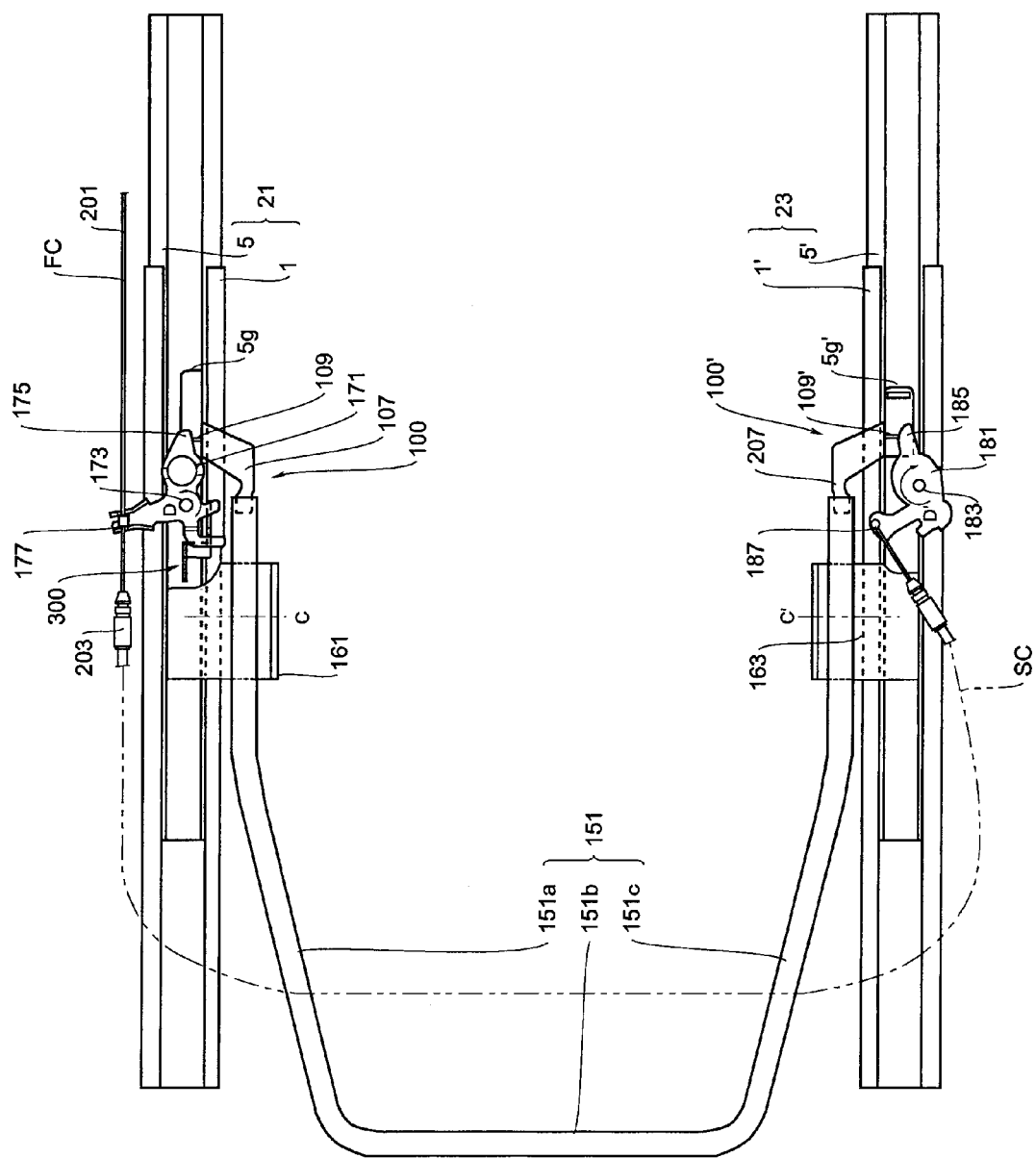
[FIG. 2] It is a top view of a walk-in seat from which a seat is removed.
Figure 3:
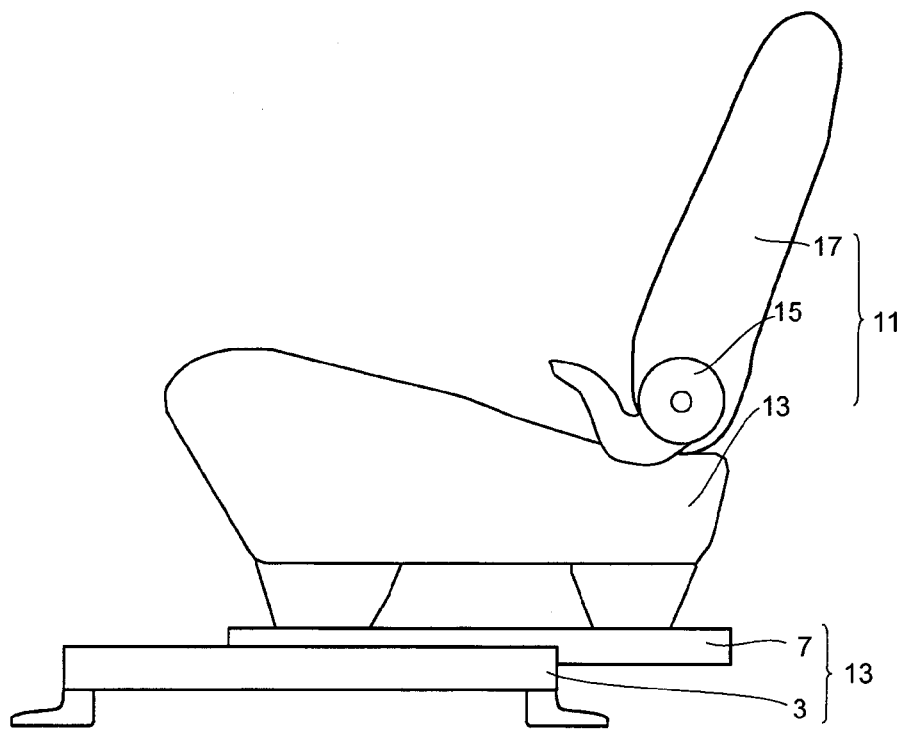
[FIG. 3] It is a configurative view of the walk-in seat of the embodiment as viewed from a side.
Figure 4:
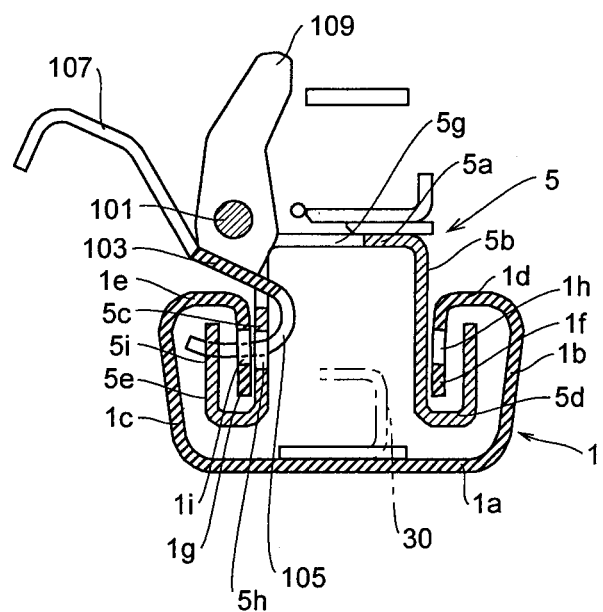
[FIG. 4] It is a section view along a line A-A of FIG. 1.
Figure 5:
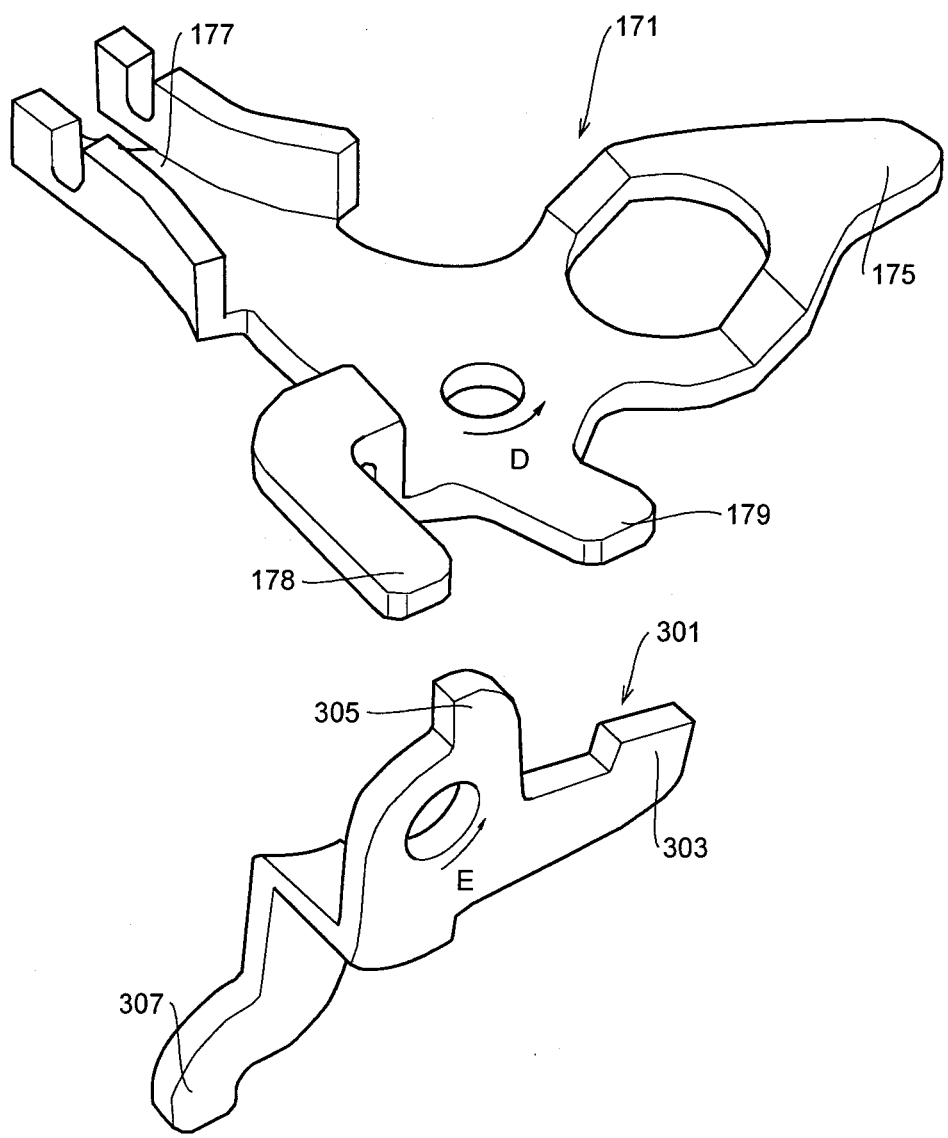
[FIG. 5] It is an enlarged perspective view of each of a first control lever and a memory plate.
Figure 6:
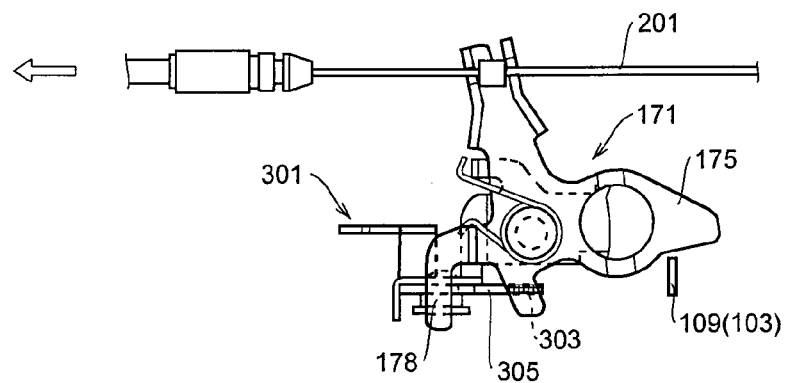
[FIG. 6] It is a top view for illustrating operation of each of the first control lever and a cancel lever.
Figure 7:
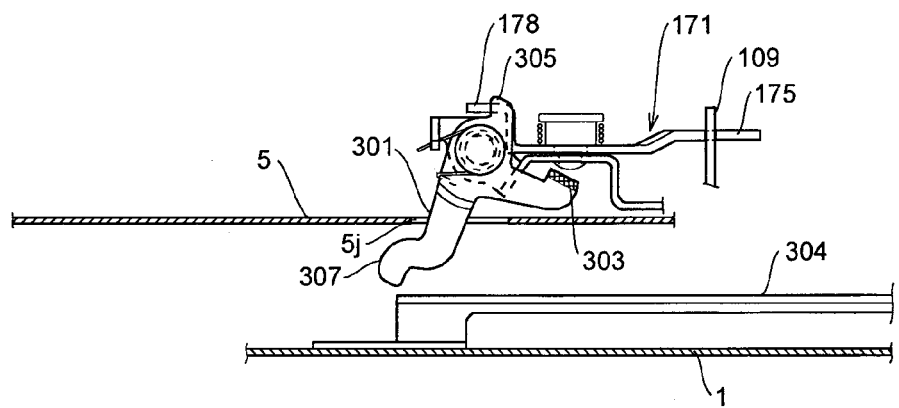
[FIG. 7] It is a front view of FIG. 6.
Figure 8:
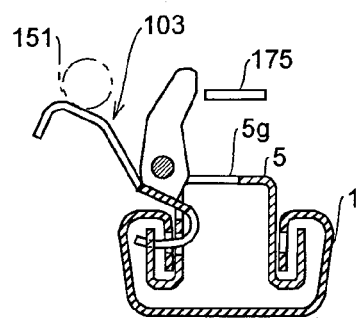
[FIG. 8] It is a section view for illustrating operation of a locking mechanism in the state of FIG. 6.
Figure 9:
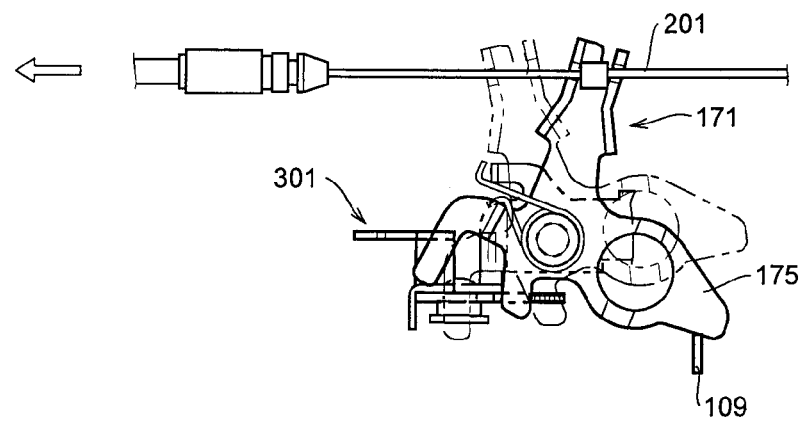
[FIG. 9] It is a top view for illustrating operation of each of the first control lever and the cancel lever.
Figure 10:
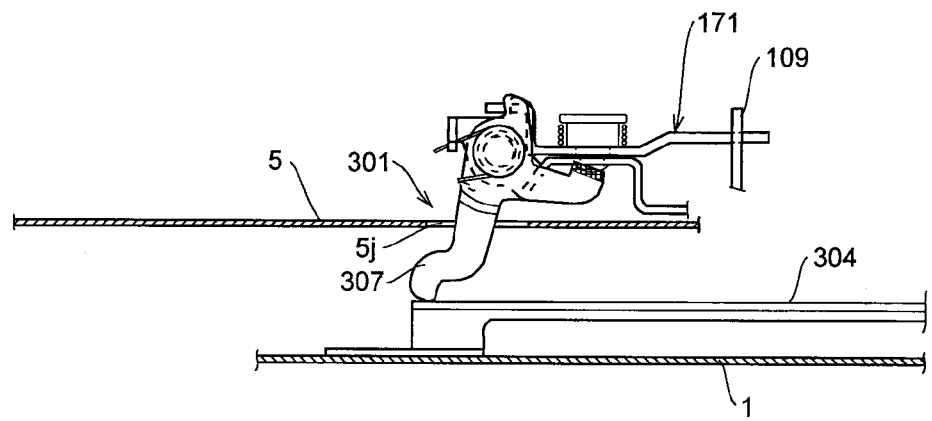
[FIG. 10] It is a front view of FIG. 9.
Figure 11:
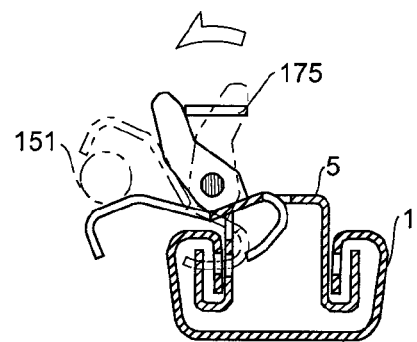
[FIG. 11] It is a section view for illustrating operation of the locking mechanism in the state of FIG. 9.
Figure 12:
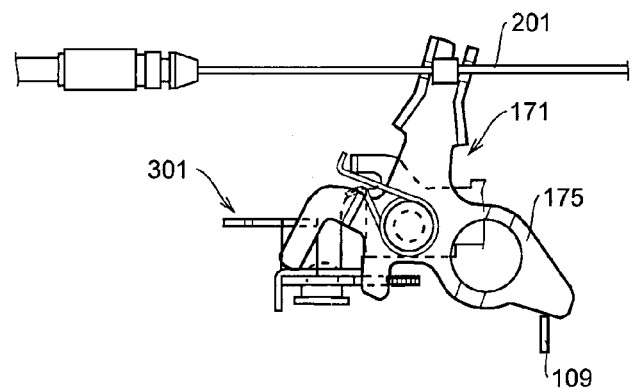
[FIG. 12] It is a top view for illustrating operation of each of the first control lever and the cancel lever.
Figure 13:
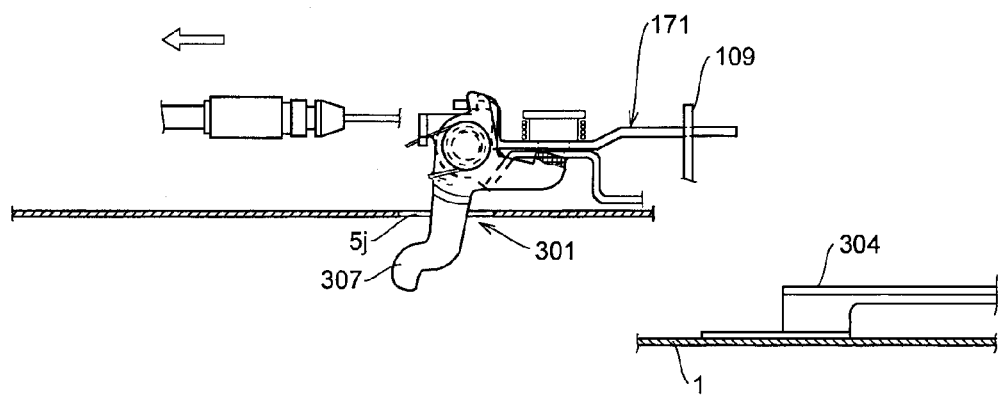
[FIG. 13] It is a front view of FIG. 12.
Figure 14:
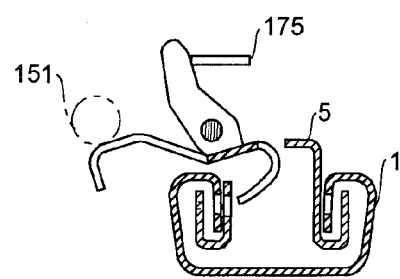
[FIG. 14] It is a section view for illustrating operation of the locking mechanism in the state of FIG. 12.
Figure 15:
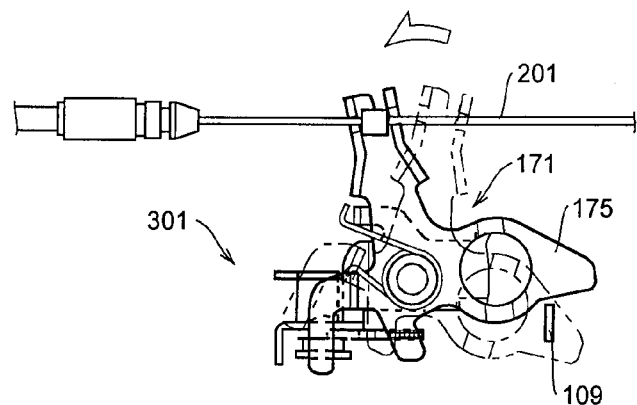
[FIG. 15] It is a top view for illustrating operation of each of the first control lever and the cancel lever.
Figure 16:
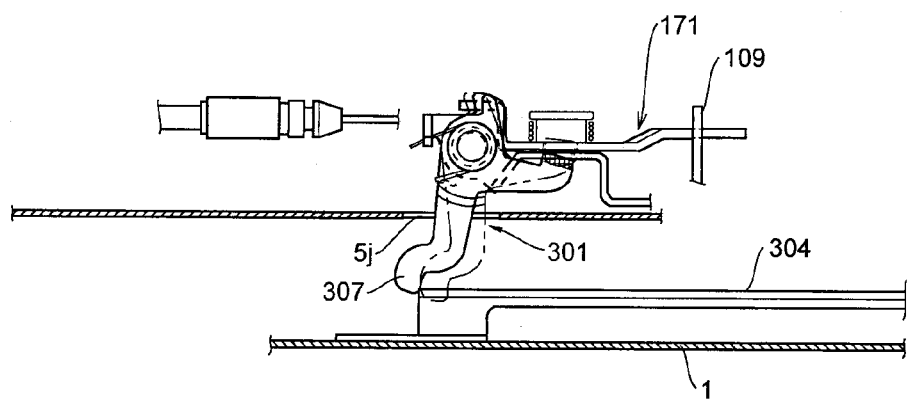
[FIG. 16] It is a front view of FIG. 15.
Figure 17:
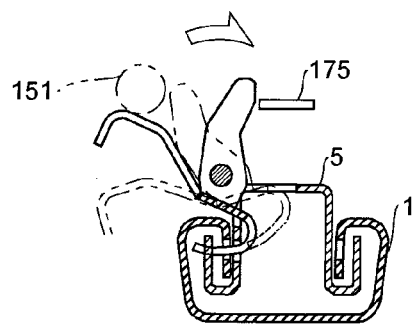
[FIG. 17] It is a section view for illustrating operation of the locking mechanism in the state of FIG. 15.

DESCRIPTION OF THE REFERENCE NUMERALS AND SIGNS 1 first lower rail
1' second lower rail
5 first upper rail
5' second upper rail
21 first seat track
23 second seat track
100 first locking mechanism
100' second locking mechanism
171 first control lever
181 second control lever
300 memory mechanism
FC first cable means
SC second cable means

The invention claimed is:
1. A walk-in seat having:
a seat having a seat cushion supporting a hip of a sitter, and a seatback provided in a tiltable manner with respect to the seat cushion to support the back of the sitter;
a first seat track including a first lower rail provided on a floor side, and a first upper rail being movably engaged with the first lower rail and being provided with the seat cushion of the seat thereon;
a second seat track provided parallel to the first seat track, the second seat track including a second lower rail provided on the floor side, and a second upper rail being movably engaged with the second lower rail and being provided with the seat cushion of the seat thereon;
a first locking mechanism provided on the first seat track to prohibit movement of the first upper rail with respect to the first lower rail;
a first control lever rotatably provided on the first upper rail to unlock the first locking mechanism;
a second locking mechanism provided on the second seat track to prohibit movement of the second upper rail with respect to the second lower rail;
a second control lever rotatably provided on the second upper rail to unlock the second locking mechanism;
a memory mechanism provided on the first seat track, the memory mechanism holding the first control lever such that when the first upper rail is located between a middle position and a foremost position regardless of the position of the seatback the first locking mechanism is unlocked;
first cable means latched on the seatback at one end, and latched on the first control lever at the other end, the first cable means operating such that when the seatback of the seat is tilted to a most forward position, the first cable means drives the first control lever to unlock the first locking mechanism; and
second cable means latched on the first control lever at one end, and latched on the second control lever at the other end, the second cable means transmitting operation of the first control lever to the second control lever.

2. The walk-in seat according to claim 1, wherein the first and second cable means includes a continuous single cable, the cable being latched on the seatback at one end, latched on the first control lever at an intermediate portion, and latched on the second control lever at the other end, and a portion of the cable from the seatback to the first control lever is formed as the first cable means, and a portion of the cable from the first control lever to the second control lever is formed as the second cable means.

3. The walk-in seat according to claim 1, wherein
the first locking mechanism is a rotatable locking mechanism and prohibits movement of the first upper rail with respect to the first rail in one of a plurality of locations;
the first control lever unlocks the first rotatable locking mechanism by causing rotation of the first rotatable locking mechanism away from a first locking position;
the second locking mechanism is a rotatable locking mechanism and prohibits movement of the second upper rail with respect to the second rail in one of a plurality of locations;
the second control lever unlocks the second rotatable locking mechanism by causing a rotation of the second rotatable locking mechanism away from a second locking position;
the memory mechanism holds the first control lever so as to keep the first rotatable locking mechanism away from the first locking position when the first upper rail is located between the middle position and the foremost position regardless of the position of the seatback;
the first cable means operates such that when the seatback of the seat is tilted to a most forward position, the first cable means rotates the first control lever so as to keep the first rotatable locking mechanism away from the first locking position; and the second cable means rotates the second control lever so as to keep the second rotatable locking mechanism away from the second locking position.

4. The walk-in seat according to claim 3, wherein the memory mechanism includes a third control lever mounted to engage said first control lever when the first upper rail is located between the middle position and the foremost position regardless of the position of the seat back and thereby prevents said first rotatable locking mechanism from rotating into said first locking position.

5. The walk-in seat according to claim 1, wherein the memory mechanism includes a third control lever mounted to engage said first control lever when the first upper rail is located between the middle position and the foremost position regardless of the position of the seat back and thereby prevents said first locking mechanism from rotating into a position that prohibits movement of the first upper rail with respect to the first lower rail.

* * * * *